United States Patent [19]

Chabot et al.

[11] 4,140,655

[45] Feb. 20, 1979

[54] OXIDATION REDUCTION CATALYST FOR THE TREATMENT OF COMBUSTION GASES AND METHOD FOR MAKING THE CATALYST

[75] Inventors: Jacqueline Chabot, Orsay; Raymond Darras, Viroflay; Roger Gabilly, Massy; Giséle de la Perriere, Paris, all of France

[73] Assignee: Commissariat a l'Energie Atomique, Paris, France

[21] Appl. No.: 804,252

[22] Filed: Jun. 7, 1977

[51] Int. Cl.$^2$ .................. B01J 21/04; B01J 23/10; B01J 23/40
[52] U.S. Cl. ............................. 252/462; 423/213.5
[58] Field of Search ............... 252/462; 423/213.5

[56] References Cited

U.S. PATENT DOCUMENTS

| | | | |
|---|---|---|---|
| 3,905,918 | 9/1975 | Mai et al. | 252/462 |
| 3,972,837 | 8/1976 | Acres et al. | 252/473 |
| 4,001,143 | 1/1977 | McCann | 252/462 |

*Primary Examiner*—W. J. Shine
*Attorney, Agent, or Firm*—Thomas R. Boland

[57] ABSTRACT

A catalyst which is capable of carrying out simultaneously the oxidation of hydrocarbons and of carbon monoxide and the reduction of nitrogen oxides which are present in the exhaust gases of internal combustion engines comprises a support of inert material coated with lanthanum oxide and a catalytic phase constituted by ruthenium combined with lanthanum in the form of mixed oxide of the perovskite type, by platinum or palladium and by rhodium.

26 Claims, 3 Drawing Figures

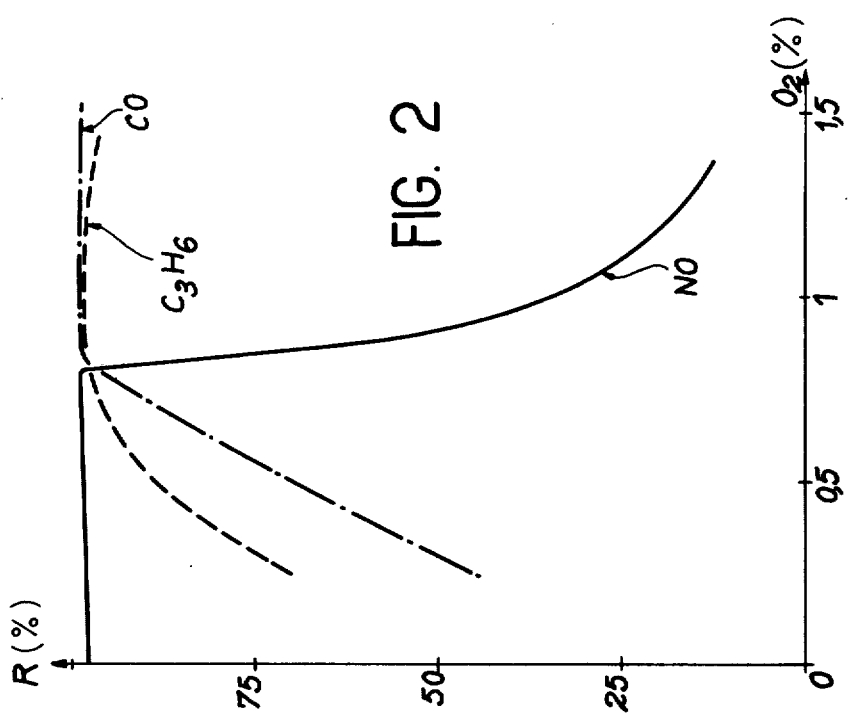
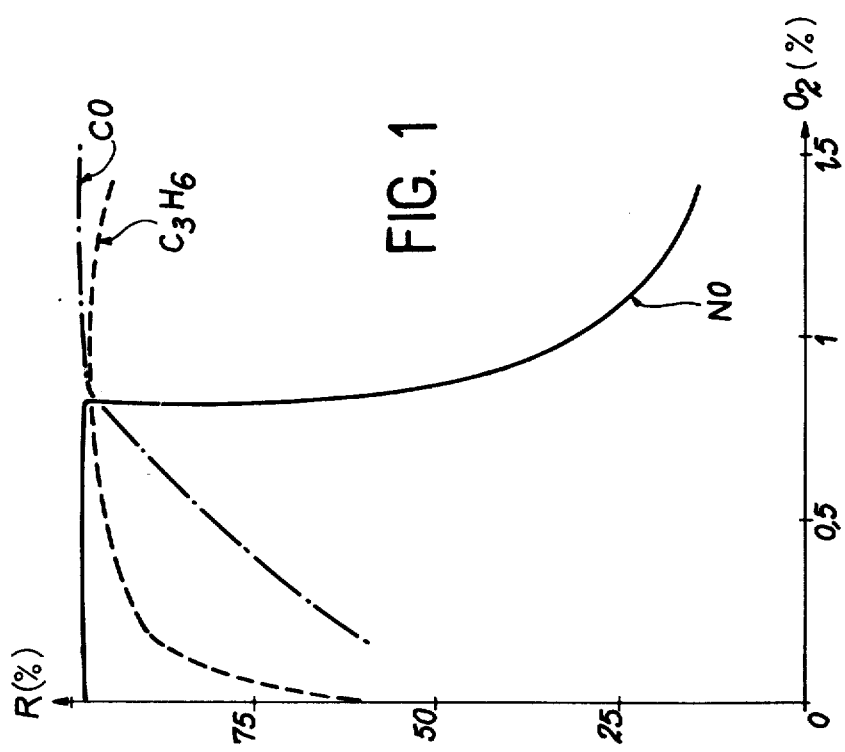

OXIDATION REDUCTION CATALYST FOR THE TREATMENT OF COMBUSTION GASES AND METHOD FOR MAKING THE CATALYST

This invention relates to an oxidation-reduction catalyst for the treatment of combustion gases, in particular exhaust gases of internal combustion engines, and more precisely to a catalyst which is capable of carrying out simultaneously the oxidation of hydrocarbons and of carbon monoxide and the reduction of nitrogen oxides which are present in the exhaust gases of motor vehicles or automobiles.

The presence of contaminants such as hydrocarbons, carbon monoxide and nitrogen oxides in the exhaust gases of motor vehicles presents a number of problems in connection with atmospheric pollution. Up to the present time, problems of this nature have been solved by treating exhaust gases with suitable catalysts which are capable of removing these pollutants and converting them to non-injurious products by oxidation or by reduction.

One of the usual practices adopted for carrying out this treatment consists in successively passing the gases to be purified over a reduction catalyst and over an oxidation catalyst. In this case, the nitrogen oxides which are present in the exhaust gases are first reduced in an oxygen-deficient atmosphere in a first catalytic converter by means of the reduction catalyst. Oxidation of the carbon monoxide and of the hydrocarbons is then carried out in a second converter by means of the oxidation catalyst.

This method of treatment is subject to a certain number of drawbacks arising in particular from the need to process the gases in two catalytic converters. This accordingly entails the need for cumbersome devices, for the injection of air between the two converters and also makes necessary to place the first converter as close as possible to the engine cylinders since the reduction catalyst has a high start-up temperature. Moreover, this method does not make it possible to ensure complete removal of the nitrogen oxides since it is difficult to prevent a more or less substantial fraction of the nitrogen oxides which are present in the exhaust gases from being converted to ammonia in the first catalytic converter and to prevent this ammonia from being partly re-oxidized to form nitric oxide in the second converter.

In order to remove the above-mentioned disadvantages to a partial extent, it has already been proposed to treat the exhaust gases with a single catalyst which is capable of carrying out both reduction of the nitrogen oxides and oxidation of the carbon monoxide and the hydrocarbons simultaneously. However, catalysts of this type which have been developed at the present time create further problems by reason of their instability in time or their unsatisfactory efficiency at low temperatures.

The precise aim of the present invention is to provide a catalyst which overcomes these various disadvantages since oxidation of hydrocarbons and carbon monoxide and reduction of nitrogen oxides can now be carried out simultaneously by means of this catalyst which is also endowed with very good stability in time as well as good efficiency at low temperatures.

To this end, the catalyst in accordance with the invention essentially comprises a support of inert material coated with lanthanum oxide and a catalytic phase constituted by ruthenium combined with lanthanum in the form of mixed oxide of the perovskite type, by platinum or palladium and by rhodium.

This catalyst is particularly well suited to the treatment of exhaust gas, the composition of which corresponds to a stoichiometric adjustment of the air/fuel ratio.

By reason of the percentage of platinum or palladium, of rhodium and of ruthenium contained in the catalyst, this latter has good efficiency at low temperatures with respect to the principal pollutants which are carbon monoxide, the nitrogen oxides and the hydrocarbons.

Furthermore, the particular structure of this catalyst endows it with good stability in time, this stability being primarily due to the combination of ruthenium and lanthanum in the mixed oxide of the perovskite type.

In some cases, the catalytic phase of the catalysts in accordance with the invention further contains iridium and/or rhenium.

Advantageously, the catalyst in accordance with the invention has a weight content with respect to the total weight of said catalyst, of 1 to 3% lanthanum oxide, 0.02 to 0.1% rhodium, 0.05 to 0.2% platinum or palladium, 0.05 to 0.2 % ruthenium and if necessary 0.005 to 0.05 iridium and/or 0.005 to 0.05 % rhenium.

Preferably, ruthenium, platinum or palladium and rhodium are present in the catalyst in the respective ratios (by weight) of 3/5/1.5.

The supports of inert material which can be employed in the catalyst according to the invention can be fabricated either in particulate form such as beads, right cylinders or pellets, or in a monolithic form such as, for example, a honeycomb structure.

When the support is in a particulate form, the refractory material is advantageously a refractory ceramic material such as, for example, alumina, magnesia, zirconia, a silico-aluminate such as cordierite, spinel and so forth and preferably a transition alumina having a high specific surface area.

When the catalytic support is in monolithic form, the inert material can be a ceramic material of the type mentioned in the foregoing but can also be formed of a metal alloy. Monolithic supports are preferably provided with a coating of refractory oxide such as, for example, a transition alumina having a high specific surface area in order to increase the specific surface area of the support. In this case, the layer of alumina advantageously represents 2 to 15% by weight of the total weight of the catalyst.

The invention is also concerned with a method of preparation of a catalyst which is suitable for the treatment of exhaust gases of internal combustion engines.

In accordance with this method, a layer of lanthanum oxide $La_2O_3$ is first deposited on a support of inert material of suitable shape. Ruthenium is then deposited on the support of refractory material which has thus been coated, deposition being advantageously carried out by impregnation of the support with an aqueous solution which may or may not be actified and contains a soluble salt of ruthenium. The impregnated support is then subjected to a treatment with a reducing gas at a temperature of the oder of 400 to 700° C. over a period of several hours. After this deposition of ruthenium, the support is subjected to a heat treatment at a temperature within the range of 600° C. to 1100° C. in the presence of air during a period of time which depends on the temperature and ranges from two hours to one half-hour in order to synthesize a mixed oxide of ruthenium and lanthanum by reaction under the conditions of treatment of ruthenium and lanthanum oxide which was initially present on the support of refractory material.

The following step of the process consists in successively depositing on the support which has thus been treated either platinum or palladium and then rhodium. This deposition is carried out by impregnating the support with an aqueous solution which may or may not be acidified and contains a soluble salt of platinum or palladium or a soluble salt of rhodium. Each impregnation is followed by a treatment for reduction of the impregnated support by a reducing gas at a temperature of the order of 400 to 700° C. over a period of a few hours.

In accordance with an alternative embodiment of the invention, platinum or palladium and rhodium can be deposited simultaneously on the support which has been subjected to the heat treatment, this deposition being carried out by impregnating the support with an aqueous solution containing a soluble salt of platinum or palladium and a soluble salt of rhodium and by subsequent reduction of the impregnated salts to the metallic state.

In accordance with another embodiment of the invention, iridium and/or rhenium can be introduced into the catalyst. In this case, deposition of rhodium, iridium and/or rhenium can be carried out either simultaneously or separately by impregnating the support with one or a number of aqueous solutions containing at least one soluble salt selected from the group comprising the soluble salts of rhodium, iridium and rhenium followed by reduction of the impregnated salts to the metallic state by a reducing gas, the reduction process being carried out at a temperature of the order of 400 to 700° C. over a period of a few hours.

Deposition of lanthanum oxide on the support of inert material can be carried out from an aqueous solution of lanthanum nitrate. The support is impregnated with this solution, then dried and calcined in air in two steps. The first step is carried out over a period of a few hours at a temperature within the range of 350 to 600° C. in order to convert the lanthanum nitrate to lanthanum oxide. The second step also lasts a few hours and is carried out at a temperature within the range of 600 to 1100° C. in order to stabilize said oxide.

The starting lanthanum nitrate solution contains the quantity of lanthanum which is necessary in order to obtain 1 to 3% oxide by weight with respect to the total weight of catalyst.

A more complete understanding of the invention will be gained from the following examples which are not given in any limiting sense and relate to the accompanying drawings, wherein:

FIG. 1 is a graph which illustrates the respective efficiencies of conversion of NO, CO, $C_3H_6$ obtained by means of the catalyst of Example 2 as a function of the oxygen content of the gas mixture to be purified;

FIG. 2 is a graph which illustrates the respective efficiencies of coversion of NO, CO, $C_3H_6$ obtained by means of the catalyst of Example 2 which is subjected to an accelerated ageing treatment;

EXAMPLE 1

Figure 3:
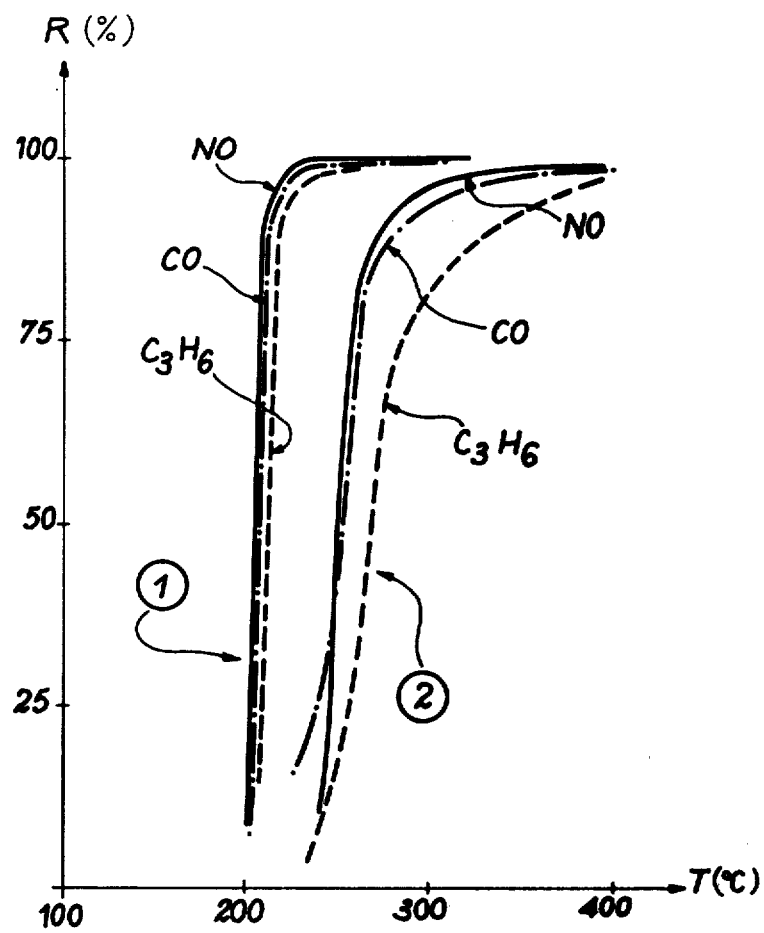
FIG. 3 is a graph which illustrates the activity of the catalyst of Example 2 as a function of the temperature before and after the ageing treatment.

This example relates to the preparation of a catalyst constituted by a support of alumina coated with lanthanum oxide and by a catalytic phase consisting of mixed oxide of ruthenium and lanthanum, of platinum and rhodium. This catalyst is prepared in the manner which will now be described.

A deposit of lanthanum oxide is formed in the first place on the alumina support which is in particulate form. Spherical particles consisting of a transition alumina of the gamma type having a specific surface area of 100 square meters per gram are impregnated with an aqueous solution of lanthanum nitrate. After impregnation, the spherical particles are dried, then calcined for a period of two hours at 500° C. in an air stream in order to convert the lanthanum nitrate to lanthanum oxide, then for a further period of two hours at 900° C., again in air, in order to stabilize said oxide. The coating of lanthanum oxide represents approximately 1.5% of the total weight of the catalyst.

Deposition of ruthenium is then carried out by impregnating the coated spherical particles with an aqueous acid solution of ruthenium chloride and by then reducing the salt thus impregnated by hydrogen during a period of approximately four hours at a temperature of 500° C. in order to restore the ruthenium to the metallic state. The impregnating solution contains a quantity of ruthenium such that the catalyst contains 0.10% by weight of ruthenium with respect to the total weight of the catalyst.

After this reduction process, the support is subjected to a heat treatment performed in air at a temperature of 900° C. during a period of approximately one hour. As a result of this treatment, the entire quantity of ruthenium has combined with part of the lanthanum oxide which was previously deposited on the support and the ruthenium is now present in the form of mixed oxide of ruthenium and lanthanum of the perovskite type.

After completion of this treatment, deposition of platinum is carried out by impregnating the support with an aqueous acid solution of chloroplatinic acid followed by a reduction in hydrogen at 500° C. for a period of approximately four hours. The impregnating solution contains a quantity of platinum such that the final catalyst contains 0.17% by weight of platinum with respect to the total weight of the catalyst.

Deposition of rhodium is then performed by impregnating the support with an aqueous solution of rhodium chloride followed by a reduction in hydrogen at 500° C. for a period of approximately four hours. The impregnating solution contains a quantity of rhodium such that the final catalyst contains 0.06% by weight of rhodium with respect to the total weight of the catalyst.

By employing a weakly acidic solution for the deposition of rhodium, the rhodium deposit is formed on the surface of the underlying structure. In contrast, the ruthenium and platinum deposits deeply impregnate the supporting structure because they are applied as strongly acidic solutions containing hydrochloric acid.

The catalyst thus obtained is efficient at low temperatures and endowed with good stability in time. The catalytic phase of this catalyst is constituted by a mixed oxide of ruthenium and lanthanum, by platinum and rhodium, the respective proportions of ruthenium, platinum and rhodium being 0.10%, 0.17% and 0.06% by weight with respect to the total weight of the catalyst.

The activity of said catalyst has been determined in a laboratory reactor in the presence of a mixture of synthesis gas which simulates the exhaust gases of motor vehicles or automobiles. The composition of this mixture was as follows:

carbon monoxide : 0.60%,
nitric oxide : 0.10%, hydrogen : 0.16%,
propylene : 0.03%,
oxygen : 0.47%,
carbon dioxide gas : 10%,
water vapor : 10%,
complement of nitrogen.

This gas mixture is circulated over the catalyst in the fresh state at a spatial velocity of 50,000 $h^{-1}$ and the necessary treatment temperatures were determined in order to ensure respective conversions by the catalyst of 10%, 50% and 90% of nitric oxide, of carbon monoxide and of propylene. The results obtained are grouped together in Table 1.

Table 1 given hereunder also records the results obtained with a catalyst which has been subjected to an accelerated ageing treatment at 990° C. for eighteen hours in the presence of a gas mixture having the following composition :
nitrogen : 74%,
carbon dioxide gas : 12%,
water vapor : 12%,
oxygen : 2%.

After this ageing treatment, the activity of the catalyst was again determined as a function of the temperature under the same conditions as in the case of the catalyst in the fresh state.

TABLE 1

| Pollutant to be removed | NO | | | CO | | | $C_3H_6$ | | |
|---|---|---|---|---|---|---|---|---|---|
| Conversion efficiency | 10% | 50% | 90% | 10% | 50% | 90% | 10% | 50% | 90% |
| Conversion temp. °C (fresh catalyst) | 170 | 200 | 230 | 180 | 210 | 250 | 200 | 240 | 270 |
| Conversion temp. °C (aged catalyst) | 265 | 335 | 400 | 240 | 310 | 385 | 330 | 370 | 410 |

The results obtained show that the activity of the catalyst remains very satisfactory despite the fact that it is slightly weakened by the ageing treatment which is particularly exacting, especially in regard to the temperature to be chosen and the oxygen content.

EXAMPLE 2

A catalyst constituted by a monolithic support of cordierite coated with alumina and by a catalytic phase consisting of mixed oxide of ruthenium and lanthanum, of platinum and rhodium.

The mode of operation of Example 2 can be explained in detail as follows:

In an initial step, the monolithic support of cordierite having the formula 4(Mg, Fe) 0.4 $Al_2O_3$, 10 $SiO_2$, $H_2O$ is coated with a first layer of alumina having a high specific surface area and obtained by precipitation from sodium aluminate in a carbon dioxide gas stream followed by calcination at 1000° C.

In this case, the alumina layer represents 7.8% by weight of the total weight of the catalyst.

The support thus coated is then impregnated with an aqueous solution of lanthanum nitrate. After impregnation, the support is dried, then calcined for a period of two hours at 500° C. in an air stream in order to convert the lanthanum nitrate to lanthanum oxide and then for a further period of two hours at 900° C. again in air in order to stabilize said oxide.

The lanthanum oxide coating represents approximately 1.5% by weight of the total weight of the catalyst.

Deposition of ruthenium is then carried out by impregnating the coated support with an aqueous solution of ruthenium chloride and by then reducing the impregnated salt by hydrogen for a period of approximately four hours at a temperature of 500° C. in order to restore the ruthenium to the metallic state. The impregnating solution contains a quantity of ruthenium such that the catalyst contains 0.12% by weight of ruthenium with respect to the total weight of the catalyst.

After this reduction, the support is subjected to a heat treatment carried out in air at a temperature of 1000° C. for a period of approximately one hour.

When this teatment has been completed, deposition of platinum is carried out by impregnating the support with an aqueous solution of chloroplatinic acid followed by a reduction for approximately four hours in hydrogen at 500° C. The impregnating solution contains a quantity of platinum such that the final catalyst contains 0.14% by weight of platinum with respect to the total weight of the catalyst.

Deposition of rhodium is then carried out by impregnating the support with an aqueous solution of rhodium chlordie followed by a reduction for a period of approximately four hours in hydrogen at 500° C. The impregnating solution contains a quantity of rhodium such that the final catalyst contains 0.07% by weight of rhodium with respect to the total weight of the catalyst.

The activity of this catalyst has been determined in the laboratory in the presence of a gas mixture containing:

| carbon monoxide | | 1.5 | % |
|---|---|---|---|
| nitric oxide | | 0.2 | % |
| propylene | | 0.04 | % |
| carbon dioxide gas | | 10 | % |
| water vapor | | 10 | % |
| nitrogen | complement to | 100 | % | and oxygen in different concentrations ranging from 0 to 1.5%.

In these tests, the gas mixture is circulated over the catalyst either in the fresh state or in the aged state at a spatial velocity of 50,000 $h^{-1}$ and at a temperature of 450° C.

It is noted that the catalyst in the aged state has been subjected to an accelerated ageing treatment at 1000° C. for a period of 18 hours in the presence of the following gas mixture:

| carbon dioxide gas | 12% |
|---|---|
| water vapor | 12% |
| oxygen | 2% | at an hourly spatial velocity of 50,000 h$^{-1}$.

The results obtained as indicated in Table 2 and shown in FIGS. 1 and 2 relate respectively to the catalyst in the fresh state and to the catalyst in the aged state.

In these figures, the efficiency R of conversion (in %) of the different pollutants : NO, CO and C$_3$H$_6$ have been plotted as ordinates in these figures as a function of the oxygen content of the gas mixture to be treated.

It is found that this catalyst has very good catalytic activity in its stoichiometry (0.85% O$_2$) in the fresh state. This corresponds to more difficult conditions than in a reducing medium both in regard to reduction of the nitrogen oxides (98% conversion efficiency in the case of NO) and in regard to oxidation of carbon monoxide (98% conversion efficiency in the case of CO) and of hydrocarbons (98% conversion efficiency in the case of C$_3$H$_6$).

Moreover, it is found that the conversion efficiency in respect of NO decreases only beyond the stoichiometric point in an oxidizing medium.

A feature which is also worthy of note is the fact that, when no oxygen is present (highly reducing medium), this catalyst has a very good conversion activity (reaction with H$_2$O) in the case of CO and C$_3$H$_6$ which permits practically complete removal (more than 75%) of CO and C$_3$H$_6$ between O and 0.5% oxygen.

This feature is particularly advantageous in certain stages of operation of the engine with a rich mixture (starting, acceleration).

It is found in addition that, after accelerated ageing at 1000° C. in an oxidizing medium, the catalyst retains very good activity in its stoichiometry (98% conversion efficiency for CO and C$_3$H$_8$ - 85% conversion efficiency for NO) as well as good conversion activity at 0.5% oxygen, which shows that this catalyst is well stabilized.

The temperatures which correspond respectively to 10%, 50% and 90% conversion of nitric oxide, carbon monoxide and propylene have also been determined. The composition of the gas mixture which simulates automobile exhaust gases and corresponds to a stoichiometric mixture (richness = 1) is as follows:

| CO | 1.5 % | CO$_2$ | 10 % |
| NO | 0.2 % | H$_2$O | 10 % |
| C$_3$H$_6$ | 0.04 % | O$_2$ | 0.8 % |
| N$_2$ | complement | | | with a spatial velocity of 50,000 h$^{-1}$

These measurements have also been determined after accelerated ageing of the catalyst at 1000° C. in an oxidizing medium (under the same conditions as before).

The results are grouped together in Table 3 and illustrated in FIG. 3 which gives the conversion efficiencies R (in %) in respect of the pollutants : NO, CO and C$_3$H$_6$ as a function of the temperature in the case of the catalyst in the fresh state (curves 1) and in the case of the catalyst in aged state (curves 2).

It is consequently found that the starting temperatures (10% conversion) are particularly low in the case of fresh catalyst and in the case of the three principal pollutants (in the vicinity of 205° C. in the case of NO, CO and C$_3$H$_6$) and that their removal is practically complete above 230° C.

It is also found that, after ageing at 1000° C., the catalyst retains very good activity despite the fact that it exhibits a slight reduction in activity which results in a slight displacement of the curves towards higher temperature values.

It is recalled that the conditions of test in a stoichiometric mixture are particularly unfavorable for the conversion of nitrogen oxides since it is in the vicinity of stoichiometry that the activity of the catalyst usually decreases very rapidly in the case of the nitrogen oxides.

TABLE 2

| Concentration in O$_2$ | 0.5% | | | 0.8% | | | 1% | | |
| --- | --- | --- | --- | --- | --- | --- | --- | --- | --- |
| Pollutant to be removed | NO | CO | C$_3$H$_6$ | NO | CO | C$_3$H$_6$ | NO | CO | C$_3$H$_6$ |
| Conversion efficiency in % (fresh catalyst) | 98 | 95 | 80 | 98 | 98 | 98 | 30 | 99 | 99 |
| Conversion efficiency in % (aged catalyst) | 98 | 70 | 90 | 85 | 98 | 98 | 35 | 99 | 99 |

TABLE 3

| Pollutant removed | CO | | | NO | | | C$_3$H$_6$ | | |
| --- | --- | --- | --- | --- | --- | --- | --- | --- | --- |
| Conversion efficiency | 10% | 50% | 90% | 10% | 50% | 90% | 10% | 50% | 90% |
| Conversion temperature in ° C. (fresh catalyst) | 205 | 205 | 210 | 205 | 205 | 215 | 205 | 210 | 220 |
| Conversion temperature in ° C. (aged catalyst) | 215 | 250 | 280 | 240 | 250 | 270 | 240 | 270 | 330 |

What we claim is:

1. A catalyst comprising a support of inert material coated with a composite phase comprising lanthanum oxide, a mixed oxide of the perovskite type consisting of ruthenium and lanthanum, and either platinum and rhodium or palladium and rhodium, said rhodium and either platinum or palladium being deposited on said mixed oxide either separately or in mixed form.

2. A catalyst according to claim 1 wherein said composite phase includes palladium and rhodium.

3. A catalyst according to claim 2 and having a weight content with respect to the total weight of the catalyst of 1 to 3% lanthanum oxide, 0.05 to 0.2% ruthenium, 0.02 to 0.1% rhodium and 0.05 to 0.2% palladium.

4. A catalyst according to claim 1, wherein the catalytic phase additionally contains iridium and/or rhenium.

5. A catalyst according to claim 4 and having a weight content with respect to the total weight of the catalyst of 0.005 to 0.05% iridium and/or 0.005 to 0.05% rhenium.

6. A catalyst according to claim 1, wherein the support is in particulate form.

7. A catalyst according to claim 1, wherein the support is in monolithic form.

8. A catalyst according to claim 6, wherein the inert material is of ceramic.

9. A catalyst according to claim 8, wherein the ceramic is alumina.

10. A catalyst according to claim 7, wherein the inert material is a ceramic coated with alumina.

11. A catalyst according to claim 10, wherein the monolithic support is cordierite coated with alumina.

12. A catalyst according to claim 10, wherein said catalyst contains 2 to 15% by weight of alumina with respect to the total weight of the catalyst.

13. A catalyst according to claim 7, wherein the inert material is a metal alloy coated with a refractory oxide.

14. A method of preparation of a catalyst, wherein said method consists in depositing a layer of lanthanum oxide on a support of inert material, depositing ruthenium on the coated support by impregnating said support with an aqueous solution containing a soluble salt of ruthenium and then reducing said impregnated salt with a reducing gas for a period of a few hours at a temperature of about 400° to about 700° C., subjecting the impregnated support to a heat treatment carried out in air at a temperature within the range of 600° to 1100° C. over a period ranging from two hours to one half-hour in order to form a mixed oxide of ruthenium and lanthanum and finally in depositing either palladium and rhodium or platinum and rhodium on the heat-treated support, said rhodium and either platinum or palladium being deposited either separately or in mixed form.

15. A method according to claim 14, wherein said method consists in depositing said layer of lanthanum oxide by impregnating said support with an aqueous solution of lanthanum nitrate and by drying then calcining said impregnated support in air in two steps, the first step being carried out over a period of a few hours at a temperature within the range of 350 to 600° C. and the second step being carried out at a temperature within the range of 600 to 1100° C. in order to stabilize said oxide.

16. A method according to claim 14, wherein said method consists first in depositing the platinum or the palladium and then the rhodium by impregnating said support with an aqueous solution containing a soluble salt of platinum or palladium and then reducing said impregnated platinum or palladium salt for a period of a few hours by a reducing gas at a temperature of about 400 to about 700° C. then by again impregnating said support with an aqueous solution containing a soluble salt of rhodium and reducing said impregnated rhodium salt for a period of a few hours by a reducing gas at a temperature of about 400 to about 700° C.

17. A method according to claim 14, wherein said method consists in simultaneously depositing the rhodium and either the platinum or the palladium by impregnating said support with an aqueous solution containing a soluble salt of platinum or of palladium and a soluble salt of rhodium and by subjecting said salts which have been impregnated on said support to a reduction by a reducing gas for a period of a few hours at a temperature of about 400 to about 700° C.

18. A method according to claim 16, wherein iridium and/or rhenium are additionally deposited on said support either separately or at the same time as rhodium by impregnation from at least one aqueous solution containing at least one soluble salt selected from the group comprising the soluble salts of rhodium, iridium and rhenium followed by reduction of said salt or salts which have been impregnated on said support by a reducing gas for a period of a few hours at a temperature of about 400 to about 700° C.

19. A method according to claim 14, wherein the reducing gas is hydrogen.

20. A method according to claim 14, wherein the temperature of reduction of said metallic salt or salts which are impregnated on said support is about 500° C.

21. A catalyst according to claim 1 wherein said composite phase includes platinum and rhodium.

22. A catalyst according to claim 7 wherein the inert material is of ceramic.

23. A catalyst according to claim 22, wherein the ceramic is alumina.

24. A catalyst according to claim 12, wherein said catalyst contains 2 to 15% by weight of alumina with respect to the total weight of the catalyst.

25. A method according to claim 17, wherein iridium and/or rhenium are additionally deposited on said support either separately or at the same time as rhodium by impregnation from at least one aqueous solution containing at least one soluble salt selected from the group comprising the soluble salts of rhodium, iridium and rhenium followed by reduction of said salt or salts which have been impregnated on said support by a reducing gas for a period of a few hours at a temperature of about 400 to about 700° C.

26. A catalyst according to claim 21 and having a weight content with respect to the total weight of the catalyst of 1 to 3% lanthanum oxide, 0.05 to 0.2% ruthenium, 0.05 to 0.2% platinum and 0.02 to 0.1% rhodium.

* * * * *